US012168631B2

(12) United States Patent
Allemand et al.

(10) Patent No.: US 12,168,631 B2
(45) Date of Patent: Dec. 17, 2024

(54) METHOD FOR MANUFACTURING A CONSOLIDATED DENSIFIED PART MADE OF CERAMIC OR MADE OF CARBON

(71) Applicants: COMMISSARIAT À L'ÉNERGIE ATOMIQUE ET AUX ÉNERGIES ALTERNATIVES, Paris (FR); CENTRE NATIONAL DE LA RECHERCHE SCIENTIFIQUE, Paris (FR); UNIVERSITE DE BORDEAUX, Bordeaux (FR)

(72) Inventors: Alexandre Allemand, Bordeaux (FR); Thierry Piquero, Fondettes (FR); Anthony Baux, Bessan (FR); Sylvain Jacques, Talence (FR); Georges Chollon, Talence (FR)

(73) Assignees: COMMISSARIAT A L'ENERGIE ATOMIQUE ET AUX ENERGIES ALTERNATIVES, Paris (FR); CENTRE NATIONAL DE LA RECHERCHE E SCIENTIFIQUE, Paris (FR); UNIVERSITE DE BORDEAUX, Bordeaux (FR)

( * ) Notice: Subject to any disclaimer, the term of this patent is extended or adjusted under 35 U.S.C. 154(b) by 681 days.

(21) Appl. No.: 17/277,143

(22) PCT Filed: Sep. 19, 2019

(86) PCT No.: PCT/FR2019/052205
§ 371 (c)(1),
(2) Date: Mar. 17, 2021

(87) PCT Pub. No.: WO2020/058647
PCT Pub. Date: Mar. 26, 2020

(65) Prior Publication Data
US 2022/0033313 A1 Feb. 3, 2022

(30) Foreign Application Priority Data

Sep. 20, 2018 (FR) .................................. 1858524

(51) Int. Cl.
*C04B 35/571* (2006.01)
*B29C 64/118* (2017.01)
(Continued)

(52) U.S. Cl.
CPC .......... *C04B 35/571* (2013.01); *B29C 64/118* (2017.08); *B33Y 10/00* (2014.12);
(Continued)

(58) Field of Classification Search
CPC ................ C04B 35/571; C04B 35/524; C04B 2235/483; C04B 235/6026; C04B 2235/614; B29C 64/118; B33Y 10/00
See application file for complete search history.

(56) References Cited

U.S. PATENT DOCUMENTS

2015/0299052 A1  10/2015  Allemand et al.
2016/0052829 A1  2/2016   Schoenfeld et al.
(Continued)

FOREIGN PATENT DOCUMENTS

EP  2987779 A1 *  2/2016  ............ B01F 5/0619
WO  2015155445 A1  10/2015

OTHER PUBLICATIONS

Nangrejo ("Processing of Ceramic Foams from Polymeric Precursor-Alumina Suspensions", Nangrejo et al., Cellular Polymers, vol. 20, No. 1, 2001, pp. 17-35) (Year: 2001).*
(Continued)

Primary Examiner — Michael G Miller
(74) Attorney, Agent, or Firm — Pearne & Gordon LLP

(57) ABSTRACT

A method for manufacturing a part from a first ceramic or from carbon, consolidated by a second ceramic, having a (Continued)

determined geometry, that involves carrying out the following sequence of steps: a) manufacturing a preform made from an organic polymer; b) impregnating the preform made from an organic polymer with a resin that is a precursor of the first ceramic or a resin that is a precursor of carbon; c) crosslinking and/or polymerising, then pyrolysing the resin that is a precursor of the first ceramic or the resin that is a precursor of carbon; to obtain a part made from a first ceramic or from carbon having the same geometry as the part to be manufactured; e) depositing the second ceramic on the part made from a first ceramic or from carbon by means of a chemical vapour deposition or CVD process or a chemical vapour infiltration or CVI process.

18 Claims, 9 Drawing Sheets

(51) Int. Cl.
    *B33Y 10/00*    (2015.01)
    *C04B 35/524*    (2006.01)

(52) U.S. Cl.
    CPC ...... *C04B 35/524* (2013.01); *C04B 2235/483* (2013.01); *C04B 2235/6026* (2013.01); *C04B 2235/614* (2013.01)

(56) References Cited

U.S. PATENT DOCUMENTS

| | | | |
|---|---|---|---|
| 2016/0347000 A1* | 12/2016 | Kerrigan | B29C 48/288 |
| 2018/0311729 A1 | 11/2018 | Allemand et al. | |
| 2020/0377418 A1 | 12/2020 | Allemand et al. | |
| 2020/0392046 A1 | 12/2020 | David et al. | |

OTHER PUBLICATIONS

Machine Translation, EP-2987779 (Year: 2016).*
International Search Report for PCT/FR2019/052205 dated Nov. 19, 2019.
Written Opinion for PCT/FR2019/052205 dated Nov. 19, 2019.
Xu, Yi et al. "Three dimensional printing of carbon/carbon composites by selective laser sintering" In: Carbon, Jan. 1, 2016, vol. 96, pp. 603-607.
Nangrejo, M R et al. "Processing of Ceramic Foams From Polymeric Precursor-Alumina Suspensions" In: Cellular Polymers, Jan. 1, 2001, vol. 23, No. 1, pp. 17-35.
Search Report for French application No. FR1858524 dated Jun. 6, 2019.
International Preliminary Report on Patentability for PCT/FR2019/052205 dated Mar. 16, 2020.

* cited by examiner

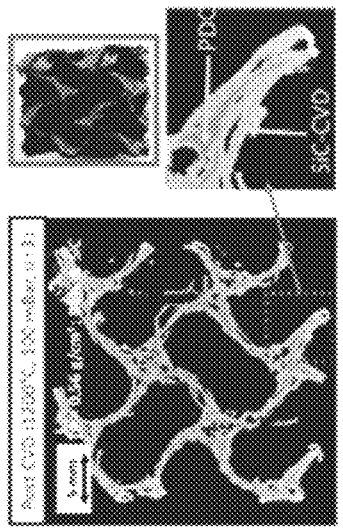
FIG.3A
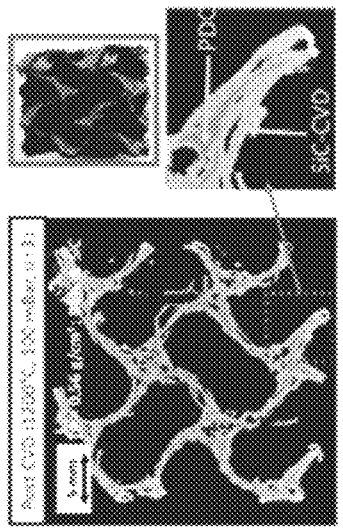
FIG.3B
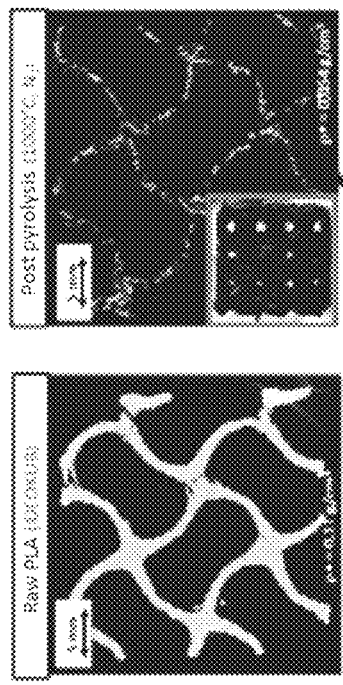
FIG.3C
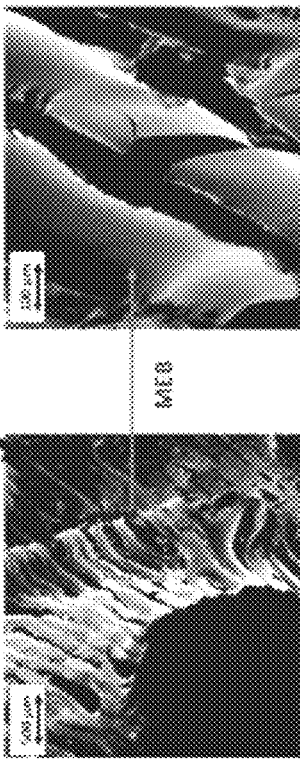
FIG.4A
FIG.4B

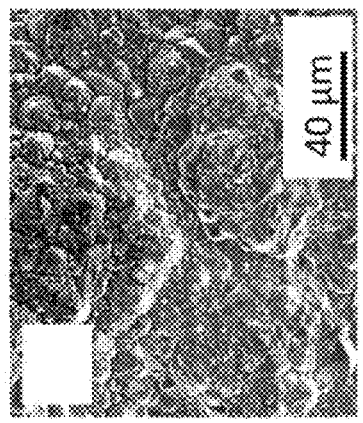
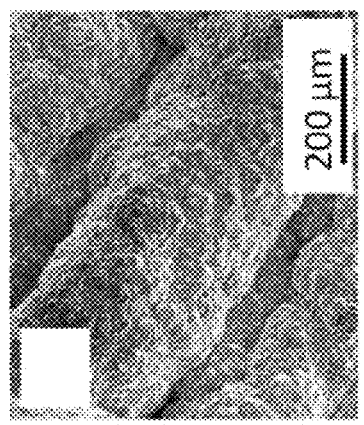
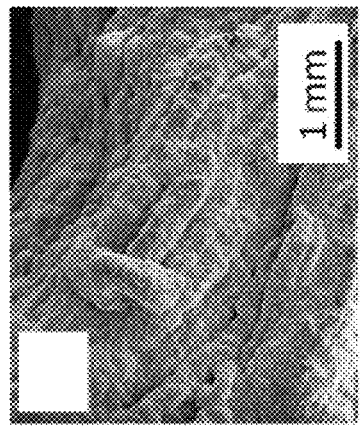
FIG. 7C
FIG. 7B
FIG. 7A

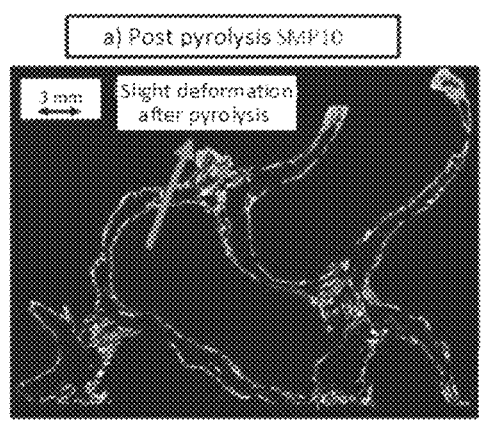
FIG.10A
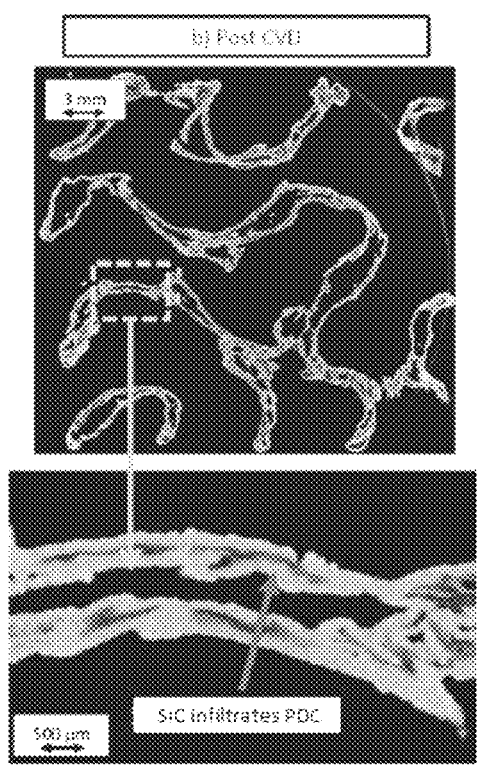
FIG.10B
FIG.10C

METHOD FOR MANUFACTURING A CONSOLIDATED DENSIFIED PART MADE OF CERAMIC OR MADE OF CARBON

CROSS-REFERENCE TO RELATED APPLICATIONS

This is a National Stage application of PCT international application PCT/FR2019/052205, filed on Sep. 19, 2019, which claims the priority of French Patent Application No. 1858524, filed Sep. 20, 2018, both of which are incorporated herein by reference in their entirety.

TECHNICAL FIELD

The invention is directed to a method for manufacturing a part made of ceramic or made of carbon.

More precisely, the invention is directed to a method for manufacturing a part made of a first ceramic or made of carbon, consolidated, densified, by a second ceramic.

The part prepared by the method according to the invention has a determined geometry, preferably a complex geometry.

The part prepared by the method according to the invention especially finds application in solar receivers for thermodynamic power plants.

The technical field of the invention may be defined as that of the preparation of parts made of ceramic or made of carbon, especially parts made of ceramic or made of carbon with complex geometries and shapes.

State of Prior Art

Parts made of ceramic or made of carbon, especially parts made of ceramic or made of carbon with complex geometries and shapes are currently manufactured by long, complex and expensive methods such as green machining, sintering, or laser sintering, especially when it is desired to obtain dense parts able to withstand high temperatures and having good mechanical strength.

Furthermore, current methods quite simply do not allow the manufacture of parts made of ceramic or made of carbon with some particularly complex geometries. In other words, some geometries are inaccessible by current manufacturing methods.

Therefore, there is a need for a method for manufacturing a part made of ceramic or made of carbon, in particular a part made of ceramic or made of carbon having a complex geometry or shape and which is simple, reliable and cost-effective.

There is, furthermore, a need for such a method which makes it possible to obtain all kinds of geometries, including geometries that were previously impossible to obtain by known manufacturing methods.

There is still a need for such a method which does not have the drawbacks, defects, limitations and disadvantages of the methods of the prior art, and which provides a solution to the problems of the methods of the prior art.

This method should especially make it possible to obtain dense parts made of ceramic or made of carbon able to withstand high temperatures and having good mechanical strength.

The goal of the invention is to provide a method for manufacturing a part made of carbon or made of ceramic that meets, inter alia, the needs and requirements mentioned above.

DISCLOSURE OF THE INVENTION

This goal as well as others are achieved, in accordance with the invention, by a method for manufacturing a part made of a first ceramic or made of carbon, densified, consolidated by a second ceramic, having a determined geometry, wherein the following successive steps are carried out:
 a) a preform made of an organic polymer is manufactured, the preform having the same geometry as the part to be manufactured;
 b) the preform made of an organic polymer is impregnated with a first-ceramic precursor resin (a resin that is a precursor of the first ceramic) (pre-ceramic resin) or a carbon precursor resin (a resin that is a precursor of carbon);
 c) the first-ceramic precursor resin (pre-ceramic resin) or the carbon precursor resin is cross-linked and/or polymerised and then pyrolysed;
 d) optionally, steps b) and c) are repeated;
whereby, at the end of step c) or step d), a part made of a first ceramic or made of carbon, having the same geometry as the part to be manufactured, is obtained;
 e) the second ceramic (consolidation ceramic) is deposited onto the part made of a first ceramic or made of carbon obtained at the end of step c) or step d), by a chemical vapour deposition (CVD) method or a chemical vapour infiltration (CVI) method.

Advantageously, the determined geometry may be a complex geometry.

The term "complex geometry" is clear for the man skilled in the art in this technical field.

By complex geometry it is generally meant:
 a geometry with a large specific surface area, for example greater than or equal to 1 m$^2$/g, especially greater than or equal to 2 m$^2$/g, or even greater than or equal to 3 m$^2$/g; and/or
 a geometry for example with recesses, and/or inner cavities, and/or concavities, and/or convexities, and/or holes, and/or blind holes, and/or tortuosities, etc.

An example of a complex geometry is a gyroid structure (see below and FIG. 1).

Advantageously, the first ceramic may be selected from oxide ceramics, nitride ceramics, and carbide ceramics.

Advantageously, the first ceramic may be selected from silicon carbide, titanium carbide, zirconium carbide, hafnium carbide, and tantalum carbide.

Advantageously, the organic polymer may be a thermoplastic polymer.

Advantageously, the thermoplastic polymer may be selected from polylactic acids (PLA), polycarbonates, polyamides, poly(vinyl chloride) (PVC), acrylonitrile-butadiene-styrene (ABS) polymers, thermoplastic elastomeric polymers such as polyurethane thermoplastic elastomeric polymers, and mixtures thereof.

Advantageously, the preform made of an organic polymer may be prepared by an additive manufacturing method.

Advantageously, the additive manufacturing method is a fused filament 3D printing method, and then the organic polymer is a thermoplastic polymer.

Advantageously, the preform made of a thermoplastic polymer may have a porosity, especially a microporosity.

This porosity or microporosity may be obtained, for example, by dissolving one of the polymers of the preform, this polymer being water-soluble, in water.

Advantageously, the first-ceramic precursor resin (pre-ceramic resin) may be selected from polycarbosilane resins, and the carbon precursor resin may be selected from phenolic resins, especially formo-phenolic resins.

Advantageously, the second ceramic (consolidation ceramic) may be selected from oxide ceramics, nitride ceramics, and carbide ceramics.

Advantageously, the second ceramic (consolidation ceramic) may be selected from silicon carbide, titanium carbide, zirconium carbide, hafnium carbide, and tantalum carbide.

Advantageously, the part is made of a first ceramic and the second ceramic is identical to the first ceramic such as SiC. The resulting dense, consolidated part so obtained may be referred to as a monolith.

The method according to the invention comprises a specific sequence of specific steps which has never been described or suggested in the prior art.

The method according to the invention meets the needs and requirements listed above and provides a solution to the problems shown by the methods of the prior art.

The method according to the invention makes it possible to obtain parts with all kinds of geometries, including geometries hitherto impossible to obtain by known manufacturing methods.

The parts made of ceramic or made of carbon obtained by the method according to the invention are dense, and they can generally withstand high temperatures, for example temperatures above 1200° C., and generally have good mechanical properties, a good mechanical strength.

By dense part, it is meant a part with a porosity rate of less than 15%. This final porosity depends on the treatment time during the final CVD step.

It may be said that the method according to the invention comprises, to make it simpler, three successive, consecutive steps to finally obtain the desired part, namely:

a first step of manufacturing a preform made of an organic polymer, especially, made of a thermoplastic organic polymer, having the same geometry as the part to be manufactured;

a second step of transforming this preform made of an organic polymer into a part made of a first ceramic or made of carbon having the same geometry as the part to be manufactured. This second transformation step includes the impregnation, cross-linking and pyrolysis steps b) and c) and optionally d) of the claimed method. This step may be referred to as a "PIP" ("Polymer Impregnation and Pyrolysis") step a third step of consolidation, densification, by a Chemical Vapour Deposition (CVD) or Chemical Vapour Infiltration (CVI) method.

By densification, it is meant that the part obtained at the end of the CVD/CVI step has a specific gravity, density higher than that of the part before this step, that is, the part obtained at the end of the pyrolysis step. For example, the specific gravity, density may be multiplied by a factor of 5 to 15, especially 6 to 11, in particular 7 to 10 during this CVD step.

The final part is a dense part, that is it has a microscopic porosity (measured by water porosity or helium pycnometry) of less than 15% of the theoretical density, which depends on the time period of the CVD treatment.

The transformation of a preform, structure made of an organic polymer, especially made of a thermoplastic organic polymer (plastic material), having especially a complex geometry, into a part, structure made of ceramic or made of carbon with the same geometry, by a cross-linking and then pyrolysis method known as the "PIP" method, then the consolidation, densification of this part made of ceramic or made of carbon by a "CVD" or "CVI" method to obtain a final consolidated, densified part of the same geometry, has never been described or suggested in the prior art. This transformation has been carried out for the first time by the method according to the invention.

If the coupling of "PIP" and "CVD/CVI" steps is known to prepare essentially inorganic materials such as composites with a ceramic matrix reinforced with inorganic fibres, there is no work mentioning the implementation of a "PIP" step to transform an initial preform made of an organic material, especially made of a plastic material, into a preform made of ceramic or made of carbon with the same geometry. A fortiori, coupling such a step of transformation by «PIP" transformation with a final "CVD/CVI" step is neither described nor suggested in the prior art.

The mixed pathway combining "PIP" and "CVD/CVI" has the advantage of being faster than a pathway only implementing a "CVD/CVI" method.

The final CVD/CVI step is here to densify, actually impart a mechanical strength to the final material.

Thus, the microscopic porosity is generally greater than 90% before the CVD/CVI step, and less than 15% (measured by water porosity or helium pycnometry) after this final CVD/CVI step.

Several advantages of CVD/CVI techniques may be recited:
  high purity of the deposited materials deposited;
  control of the stoichiometry and composition of the deposits and consequently of their properties;
  the possibility of obtaining deposits on parts with complex shapes.

Preferably, as has been set forth above, in step a) of the method according to the invention, or first step, the preform made of an organic polymer, especially made of a thermoplastic polymer, may be manufactured by an additive manufacturing method such as a fused filament 3D printing method.

3D printing of plastic filament to produce parts with complex geometries is a fast developing method. This method is simple and inexpensive and allows all geometries, even the most complex geometries, to be produced by layer to layer melting of a filament extruded through a heated nozzle.

An additive manufacturing method such as a fused filament 3D printing method makes it possible to manufacture preforms with all kinds of geometries, even with very complex geometries, at a low cost.

The additive manufacturing method such as the fused filament 3D printing method even makes it possible to manufacture preforms which, due to the extreme complexity of their geometry, could not be manufactured by any other method.

A fortiori, the combination of an additive manufacturing method such as a fused filament 3D printing method, a "PIP" step and a "CVD/CVI" step has never been described or suggested until now and makes it possible for the first time to obtain consolidated, densified, parts made of ceramic or made of carbon with a complex geometry that can generally withstand high temperatures, which generally have good mechanical properties, a good mechanical strength.

In other words, the method according to the invention successfully takes up the challenge of transforming a preform (prepared especially by an additive manufacturing method such as a fused filament 3D printing method) made of an organic polymer (such as a thermoplastic polymer), into a dense part made of a ceramic or made of carbon with good mechanical strength having the same geometry as the preform.

This transformation is achieved, surprisingly, by treating the preform during a "PIP" step and then during a "CVD/CVI" step.

Other characteristics and advantages of the invention will better appear upon reading the following detailed description of one embodiment. This detailed description is made for illustrative and not limiting purposes, in conjunction with the attached drawings.

BRIEF DESCRIPTION OF THE DRAWINGS

FIG. 2A is the image of the raw gyroid structure, in PLA, obtained after 3D printing (post-3D printing image).

FIG. 2B is the image of the gyroid structure obtained after the step of pyrolysing the resin RS101 (post-pyrolysis image).

FIG. 2C is the image of the gyroid structure obtained after the chemical vapour deposition step (post-CVD image).

FIG. 2C also shows, in the bottom right-hand corner, an enlarged image of a dotted framed portion of the image in this Figure.

Figure 1:
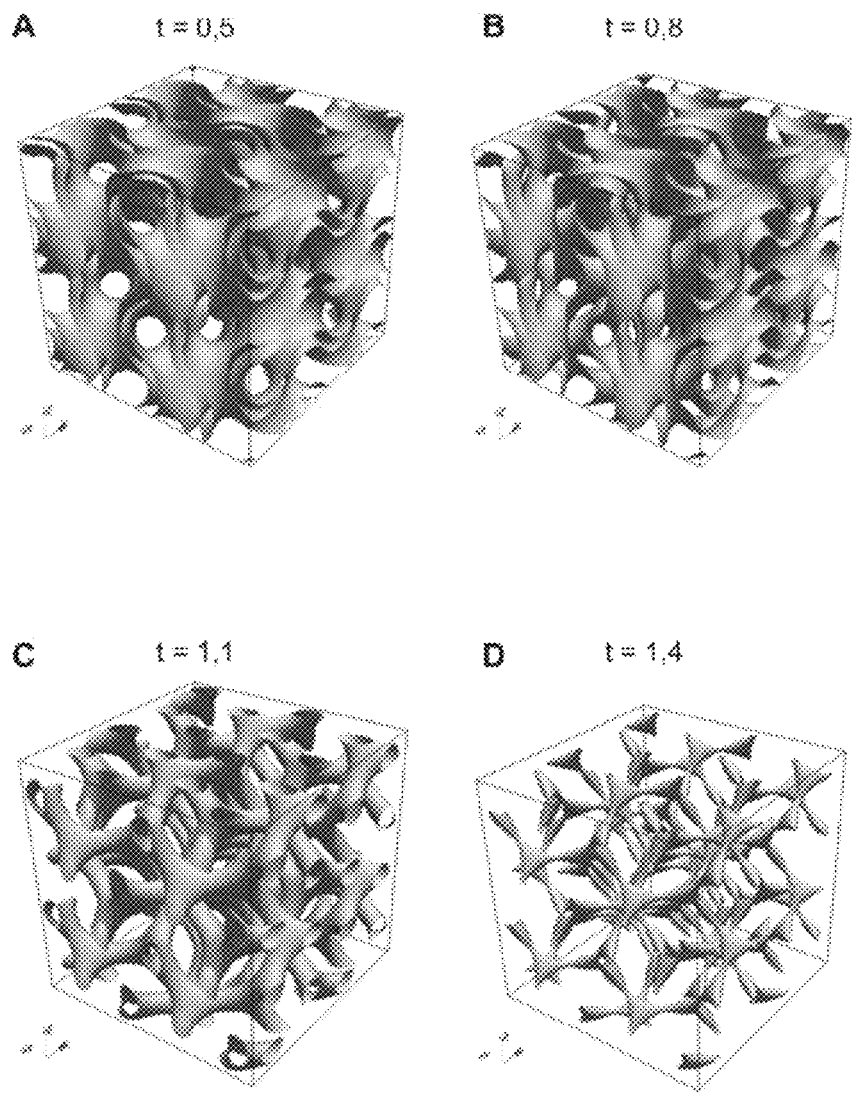
FIG. 1 shows different gyroid structures according to the selected value of "t", that is t=0.5 (A); t=0.8 (B); t=1.1 (C); t=1.4 (D).
Figure 2A:
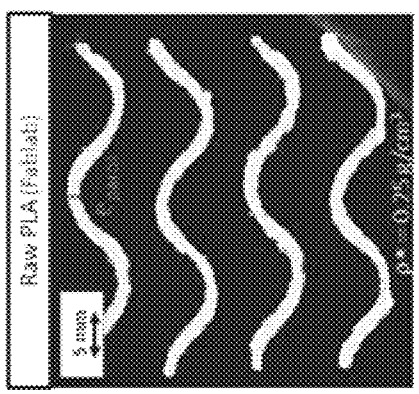
FIGS. 2A, 2B, and 2C show X-ray tomography images of a cross-section of a gyroid structure at the various stages of the method according to the invention, known as the ceramisation method, to obtain sample 1 in example 1.
Figure 2B:
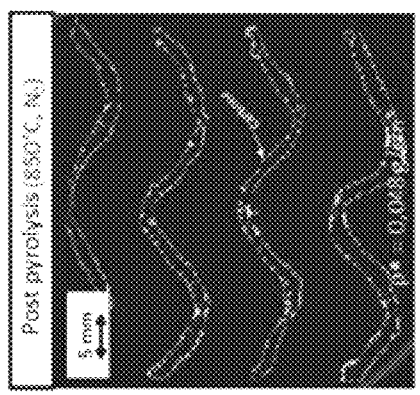
Figure 2C:
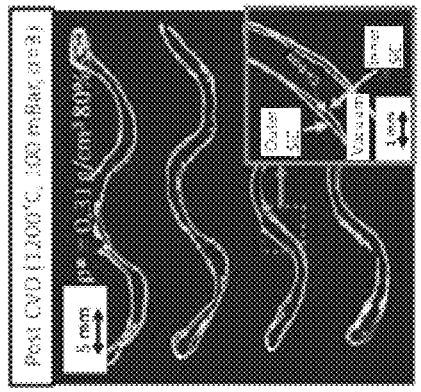

The scale shown in FIG. 2A represents 5 mm.
The scale shown in FIG. 2B represents 5 mm.
The scale shown in FIG. 2C represents 5 mm.
The scale shown in the enlarged image in FIG. 2C represents 1 mm.

FIGS. 3A, 3B, and 3C show X-ray tomography images of a cross-section of a gyroid structure at different stages of the method according to the invention, known as a ceramisation method, to obtain sample 2 in Example 2.

FIG. 3A is the image of the raw gyroid structure, made of PLA, obtained after 3D printing (post-3D printing image).

FIG. 3B is the image of the gyroid structure obtained after the step of pyrolysing the resin SMP 10 (post-pyrolysis image).

FIG. 3B, also shows, in the bottom left-hand corner, a macroscopic image of the gyroid structure.

FIG. 3C is the image of the gyroid structure obtained after the chemical vapour deposition CVD step (post-CVD image).

FIG. 3C also shows, in the top righthand corner, a macroscopic image of the gyroid structure.

FIG. 3C also shows, in the bottom right-hand corner, an enlarged image of a dotted framed portion of the image in this Figure.

The scale shown in FIG. 3A represents 5 mm.
The scale shown in FIG. 3B represents 5 mm.
The scale shown in FIG. 3C represents 5 mm.

FIGS. 4A and 4B show secondary electron (SE) scanning electron microscope (SEM) images, at two different magnifications, of the structure obtained after the pyrolysis step in Example 2 to prepare Sample 2 (FIG. 3B).

The scale shown in FIG. 4A represents 500 µm.
The scale in FIG. 4B represents 100 µm.

Figure 5:
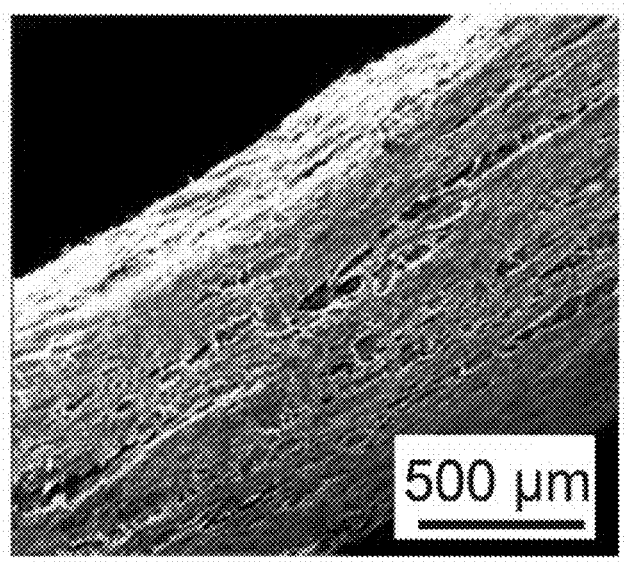

FIG. 5 shows a (SE) Scanning Electron Microscope (SEM) image of the POROLAY® structure obtained after Dipping in water in Example 3 and Example 4.

The scale in FIG. 5 represents 500 µm.

Figure 6C:
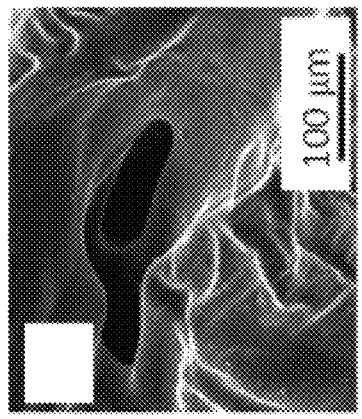
Figure 6B:
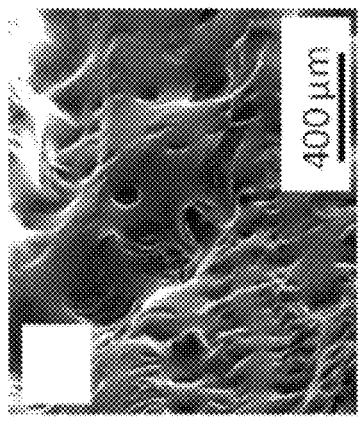
Figure 6A:
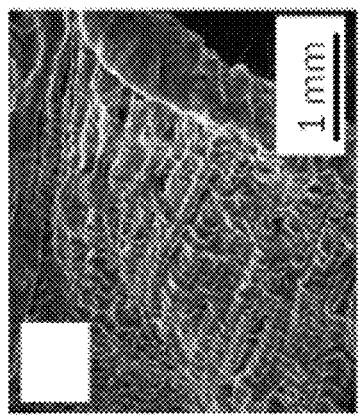

FIGS. 6A, 6B, and 6C show (SE) Scanning Electron Microscope (SEM) images of the surface of the gyroid structure obtained after the pyrolysis step of the resin RS101 in example 3 to prepare sample 3.

FIG. 6A is a view of one wall of the gyroid.

FIGS. 6B and 6C show a few microporosities present on the sample.

The scale shown in FIG. 6A represents 1 mm.
The scale shown in FIG. 6B represents 400 µm.
The scale shown in FIG. 6C represents 100 µm.

FIGS. 7A, 7B, and 7C show (SE) Scanning Electron Microscope (SEM) images of the surface of the gyroid structure obtained after the SiC deposition step by CVD, in Example 3 to prepare Sample 3.

The scale shown in FIG. 7A represents 1 mm.
The scale shown in FIG. 7B represents 200 µm.
The scale shown in FIG. 7C represents 40 µm.

Figure 8A:
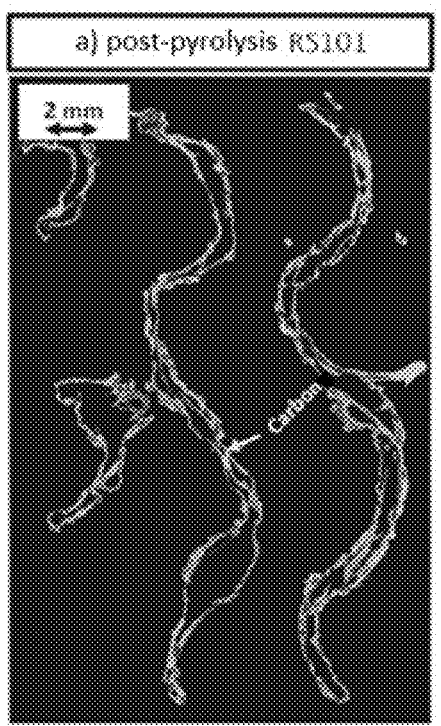
Figure 8B:
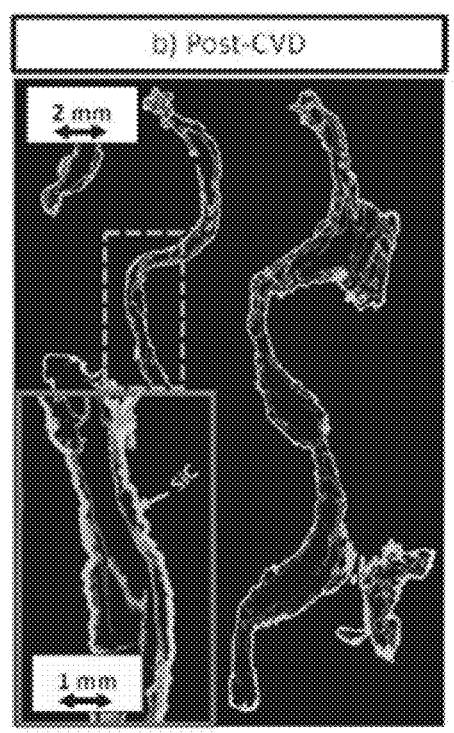

FIGS. 8A and 8B show X-ray tomography images of a cross-section of a gyroid structure at different stages of the method according to the invention, called a ceramisation method, to obtain sample 3 in example 3.

FIG. 8A is the image of the gyroid structure obtained after the pyrolysis step of the resin RS101 (post-pyrolysis image).

FIG. 8B is the image of the gyroid structure obtained after the chemical vapour deposition CVD step (post-CVD image).

FIG. 8B also shows, in the bottom left-hand corner, an enlarged image of a dotted framed portion of the image of this Figure.

The scale shown in FIG. 8A represents 2 mm.
The scale shown in FIG. 8B represents 2 mm.
The scale shown in the enlarged image of FIG. 8B represents 1 mm.

Figure 9C:
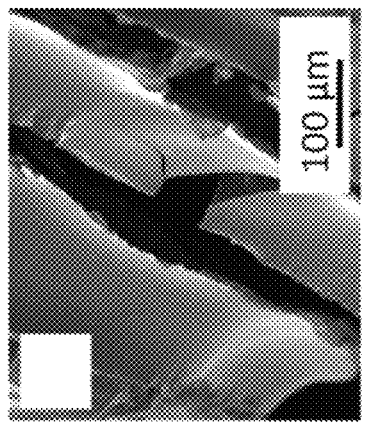
Figure 9B:
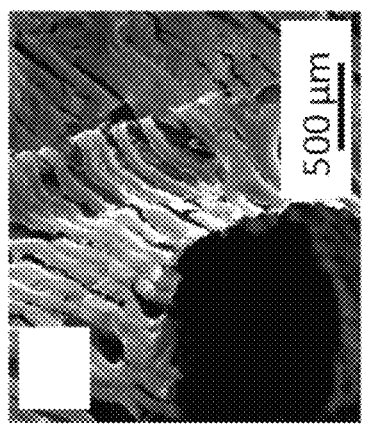
Figure 9A:
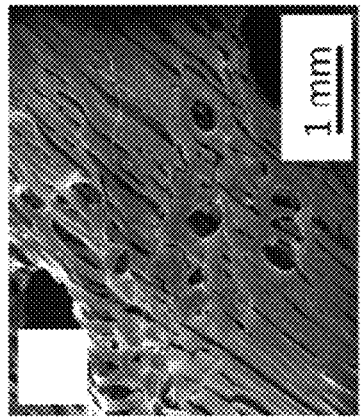

FIGS. 9A, 9B, and 9C show (SE) scanning electron microscope (SEM) images of the surface of the gyroid structure obtained after the pyrolysis step of the resin SMP10 in Example 4 to prepare Sample 4.

FIGS. 9A and 9B highlight cracks in the ceramic residue.

FIG. 9C is a close-up ("zoom") of a crack.

The scale shown in FIG. 9A represents 1 mm.
The scale shown in FIG. 9B represents 500 µm.
The scale shown in FIG. 9C represents 100 µm.

FIGS. 10A, 10B and 10C show X-ray tomography images of a cross-section of a gyroid structure at different stages of the method according to the invention, called a ceramisation method, to obtain sample 4 in Example 4.

FIG. 10A is the image of the gyroid structure obtained after the pyrolysis step of the resin SMP10 (post-pyrolysis image).

FIGS. 10B and 10C are images of the gyroid structure obtained after the chemical vapour deposition CVD step (post-CVD image).

FIG. 10C is an enlarged image of a dotted framed portion of FIG. 10B.

The scale shown in FIG. 10A represents 3 mm.
The scale shown in FIG. 10B represents 3 mm.
The scale shown in FIG. 10C represents 500 µm.

DETAILED DISCLOSURE OF PARTICULAR EMBODIMENTS

The method according to the invention is a method for manufacturing a part made of a first ceramic or made of carbon, consolidated by a second ceramic, having a determined geometry, wherein the successive steps a), b), c) listed above are carried out.

As already set forth, it can also be considered that the method according to the invention comprises, to make it simpler, three successive, consecutive steps in order to finally obtain the desired part, namely: a first step of manufacturing a preform made of an organic polymer, especially made of a thermoplastic organic polymer, having the same geometry as the part to be manufactured; a second step of transforming this preform made of an organic polymer into a part made of a first ceramic or made of carbon having the same geometry as the part to be manufactured, this second step may be referred to as a "PIP" ("Polymer Impregnation and Pyrolysis") step; and finally a third step of consolidation, densification by a Chemical Vapour Deposition (CVD) or Chemical Vapour Infiltration (CVI) method.

In step a) of the method according to the invention, a preform made of an organic polymer, especially made of a thermoplastic organic polymer, is manufactured, the preform having the same geometry as the part to be manufactured.

This manufacturing step generally comprises shaping a material made of an organic polymer, especially made of a thermoplastic organic polymer (plastic material), in order to obtain a preform made of an organic polymer having a given geometry which is the same geometry as the part to be manufactured.

There is no limitation on the geometry that this preform may have.

This geometry may be a complex geometry as defined above.

There is also no limitation on the size of this part, except the limitation dicted by the size of the CVD/CVI enclosures.

This preform may be manufactured by any known method of shaping an organic polymer, especially a thermoplastic organic polymer.

However, according to the invention, the preform made of an organic polymer, especially made of a thermoplastic organic polymer, may be advantageously manufactured by an additive manufacturing method.

Among additive manufacturing methods, the Power Bed Fusion or Sintering methods, and the fused filament 3D printing methods may especially be mentioned.

Powder Bed Fusion or Sintering methods include especially the Selective Laser Sintering, Selective Laser Melting, Beam Laser Melting, and Electron Beam Melting techniques.

Preferably, according to the invention, the additive manufacturing method is a fused filament 3D printing method.

In this method, a filament made of a thermoplastic organic polymer is melted and extruded through a nozzle. This method is also called Fused Deposition Modeling (FDM).

Advantageously, the thermoplastic polymer may be selected from polylactic acids (PLA), polycarbonates, polyamides, poly(vinyl chloride) (PVC), acrylonitrile-butadiene-styrene (ABS), thermoplastic elastomeric polymers such as polyurethane thermoplastic elastomeric polymers, and mixtures thereof.

Advantageously, the preform made of a thermoplastic organic polymer may have a porosity, especially a microporosity.

This microporosity may be generated prior to or subsequently to manufacturing the part.

In the case where the microporosity of the preform is generated subsequently to manufacturing, the following procedure may be used: a preform is manufactured made of a mixture of two polymers is manufactured, one of these polymers being soluble in a given solvent such as water, and the other polymer not being soluble in this solvent such as water.

For example, the water-soluble polymer may be polyvinyl alcohol and the other polymer, water-insoluble polymer, may be a water-insoluble elastomeric polymer.

Then the preform is dipped, immersed in said solvent, for example in water, for a sufficient time period, for example 48 to 96 hours, for the polymer soluble in this solvent, such as water, to be dissolved, whereby a microporosity is generated within the preform, and finally a microporous preform essentially consisting of the polymer insoluble in the solvent is obtained.

In step b) of the method according to the invention, the preform made of an organic polymer, especially made of a thermoplastic organic polymer, is impregnated with a first-ceramic precursor resin or with a carbon precursor resin. The first-ceramic precursor resin may be designated as a pre-ceramic resin.

If a part made of a first ceramic is desired to be manufactured, a first-ceramic precursor resin is used, or else, if a part made of carbon is desired to be manufactured, a carbon precursor resin is used.

The man skilled in the art can easily determine the precursor resin to be used depending on the first ceramic that is desired to be obtained, which may be selected from oxide ceramics, nitride ceramics, and carbide ceramics such as silicon carbide, titanium carbide, zirconium carbide, hafnium carbide, and tantalum carbide.

For example, if the first ceramic is silicon carbide SiC, the first-ceramic precursor resin may be selected from polycarbosilane resins such as allylhydridopolycarbosilane (AHPCS).

The carbon precursor resin can be selected for example from phenolic resins, especially formo-phenolic resins.

For impregnation, the preform is generally simply dipped, immersed in the pure first-ceramic precursor resin, or pure-carbon precursor resin, especially if these resins are liquid at room temperature, or else, these resins may be diluted in a solvent.

The resin is deposited onto the surfaces of the preform made of an organic polymer, especially made of a thermoplastic organic polymer, that is on the outer (visible) surfaces, and the inner surfaces (except for the porosity), and possibly inside the porosity, especially the possible microporosity, and after cross-linking and pyrolysis allows a structure made of a first ceramic or made of carbon to be obtained.

In step c) of the method according to the invention, the first-ceramic precursor resin (pre-ceramic resin) or the carbon precursor resin is cross-linked and then pyrolysed.

Cross-linking may be carried out at a so-called cross-linking temperature, from 150° C. to 180° C., for example at a temperature of 170° C. or 160° C., maintained for a time period of 3 to 4 hours, for example 3 hours. In other words, a plateau is observed at the curing temperature during the above-mentioned time period.

This cross-linking temperature plateau may be reached by observing one or more temperature rise ramps, for example from room temperature or from 100° C.

This ramp or these ramps may have the same or different slopes, for example ranging from 0.2° C./minute to 0.5° C./minute. For example, a ramp may be observed with a slope of 0.4° C./minute from room temperature (20° C.) or from 100° C. up to for example 165° C.

Cross-linking may be carried out under air, or under an inert gas such as nitrogen or argon if the resin is air sensitive.

Pyrolysis may be carried out at a so-called pyrolysis temperature, from 800° C. to 1100° C., for example at a temperature of 850° C. or 1000° C., maintained for a period of 0 to 2 hours, for example 1 hour. In other words, a plateau is observed at the pyrolysis temperature during the above-mentioned time period.

This pyrolysis temperature plateau may be reached by observing one or more temperature rise ramps, for example from room temperature (20° C.).

This ramp or these ramps may have the same or different slopes ranging from 1° C./minute to 5° C./minute. For example, a temperature rise ramp with a slope of 5° C./minute from room temperature (20° C.) to 150° C. can be observed, and then a temperature rise ramp with a slope of 1° C./minute from 150° C. to 600° C., and then a temperature rise ramp with a slope of 5° C./minute up to 850° C., then immediately (the plateau is therefore 0 minute) a temperature decrease ramp down to room temperature (20° C.) with a slope of 20° C./minute may be observed.

Pyrolysis is generally carried out under an inert gas atmosphere, such as nitrogen or argon, to avoid any oxidation of the carbon or of the ceramic, such as SiC, at high temperature.

The sequence of steps b) and c) may be repeated from 1 to n times, with for example
n=10, whereby, at the end of step c) or step d), a part made of a first ceramic or made of carbon with the same geometry as the part to be manufactured is obtained.

The so-called transformation step includes steps b) and c) of impregnation, cross-linking and pyrolysis and optionally d) of the claimed method. This step may be referred to as the "PIP" ("Polymer Impregnation and Pyrolysis") step. This step makes it possible to switch from a preform made of an organic polymer, for example made of a thermoplastic organic polymer, to a part of the same geometry but made of an inorganic material, of ceramic, or of carbon. Indeed, during this transformation step, the organic polymer is completely removed, eliminated, and decomposed, and at the end of this step only a ceramic or carbon skeleton remains, but with the same geometry as the preform and the final part to be manufactured.

However, the first part made of ceramic or made of carbon with the same geometry as the part to be manufactured obtained at the end of step c) or step d) generally remains very brittle, even if several successions, sequences of steps b) and c) are carried out. It has therefore to be consolidated, densified, and this is what is done during final step e) of the method according to the invention.

During step e), the second ceramic, called consolidation or densification ceramic, is deposited onto the part made of a first ceramic or made of carbon obtained at the end of step c) or step d), by a Chemical Vapour Deposition (CVD) method or a Chemical Vapour Infiltration (CVI) method.

By depositing onto the part, it is meant that a deposit of the second ceramic is made on all the outer and inner surfaces, except for the porosity, for example microporosity, of the part and possibly inside the possible porosity. This deposit may have a thickness of 1 to 200 microns, for example 100 microns. This deposit enables the part to be consolidated and densified.

The consolidation, second ceramic may be selected from oxide ceramics, nitride ceramics, and carbide ceramics, preferably, the consolidation, second ceramic may be selected from silicon carbide, titanium carbide, zirconium carbide, hafnium carbide, and tantalum carbide.

Preferably, the part is made of a first ceramic and the second ceramic is identical to the first ceramic such as SiC.

The final manufactured part may then be considered as a monolith made of a single ceramic.

The density of this final part may be for example 3.1 g/cm$^3$ i.e. 97% of the theoretical density for a SiC part.

Conditions for the "CVD/CVI" method may be easily determined by the man skilled in the art depending on the second ceramic desired to be deposited and depending on the importance and thickness of the deposit desired to be made.

Thus, especially, the oven temperature, the reaction time, the total pressure, the nature of the precursor(s), the flow rate of the precursor(s), and the hydrogen flow rate may be easily determined by the man skilled in the art depending on the second ceramic desired to be deposited and depending on the importance of the deposit desired to be made.

For example, in the case where the second ceramic is SiC, the precursor is MethylTrichloroSilane (MTS).

The final part obtained is dense, that is its porosity (measured by water porosity or helium pycnometry) is less than 15% of the theoretical density, and it is consolidated, that is it is not brittle, friable and has good mechanical properties, for example close to monolithic SiC, and high temperature resistance.

Indeed, it is the last CVD step that impart the whole final strength to the part.

The invention will now be described with reference to the following examples given for illustrative and not limiting purposes.

EXAMPLES

In the following examples, four samples, namely four ceramic parts with a complex geometry have been prepared by the method according to the invention.

In Table 1, the architecture, geometry of the preform, initial structure made of a thermoplastic polymer material is indicated. This architecture, geometry is the same as that of the final ceramic part.

The initial structure which is prepared in the following examples by 3D printing is a gyroid structure which will be described later in detail.

Such a gyroid structure has the feature of having a very complex geometry, impossible to achieve in ways other than by 3D printing.

In Table 1, the nature of the thermoplastic material constituting the filament used for preparing the preform by 3D printing during step a) of the method according to the invention is also set forth.

Two types of filament have been used, namely a conventional plastic filament made of polylactic acid PLA for samples 1 and 2, and a microporous filament made of POROLAY (a mixture of PVA and an elastomer) for samples 3 and 4. It will be seen that the best results were obtained with the latter.

In Table 1, furthermore, the nature of the ceramic precursor resin, or transformation or impregnation resin used in step b) of the method according to the invention is mentioned.

Finally, in Table 1 conditions for the consolidation or densification step, that is step e) of the method according to the invention have been indicated.

TABLE 1

Description of the materials, structures, materials and methods implemented in the examples.

| Sample No. | 1 | 2 | 3 | 4 |
|---|---|---|---|---|
| Architecture | Gyroid | Gyroid | Gyroid | Gyroid |
| Nature of the 3D printing filament | PLA | PLA | POROLAY | POROLAY |
| Transformation resin | RS101 (C precursor) | SMP10 (SiC precursor) | RS101 (C precursor) | SMP10 (SiC precursor) |
| Consolidation step | SiC CVD/CVI | SiC CVD/CVI | SiC CVD/CVI | SiC CVD/CVI |

1. Structure Involved: The Gyroid Structure.

Gyroid structures are minimal surfaces with a triple periodicity (with an average curvature of zero). They belong to the cubic space group Ia-3d and form porous structures with the topology of an open-cell foam. The use of these structures requires an understanding of their geometry and properties.

As regards the geometry of gyroids, their structure can be approximately described by the following equations (1) and (2):

$$F(x, y, z) = t \quad (1)$$

where (2)

$$F(x, y, z) = \sin\left(\frac{2\pi x}{a}\right)\cos\left(\frac{2\pi y}{a}\right) + \sin\left(\frac{2\pi y}{a}\right)\cos\left(\frac{2\pi z}{a}\right) + \sin\left(\frac{2\pi z}{a}\right)\cos\left(\frac{2\pi x}{a}\right)$$

where "a" is the periodicity of the gyroid structure and "t" is a constant within the range $-1.5 < t < 1.5$. Depending on the value of "t", the shape and properties of the structure vary. Thus, the higher the value of "t", the greater the porosity, as shown in FIGS. 1A, 1B, 1C, and 1D where gyroids are represented with values of "t" of 0.5 (FIG. 1A); 0.8 (FIG. 1B); 1.1 (FIG. 1C); and 1.4 (FIG. 1D) respectively. The porosity is minimal for a value of t=0. In this case, there is as much void as material and the void and solid volumes have the same geometry. For each node of the structure, the connection is three. Along the direction (100) or (111), different families of parallel channels, probably associated with a high permeability, are observed. Their curvature would allow a better flexibility than a simple lattice as well as a good resistance to thermal shocks and gradients.

2. Raw Materials.

2.1. Conventional Filament of Polylactic Acid (PLA) Used for 3D Printing.

In the case of samples 1 and 2, the initial structure, preform is printed using a commercial filament of PLA (polylactic acid). This filament is produced by the company Ultimaker®. It is white PLA with a diameter of 1.75 mm. In this case, structures, preforms prepared by 3D printing, are not dipped in water, as there is no microporosity to be revealed.

2.2. Microporous Filament Used for 3D Printing.

The 3D printing filament used in the case of samples 3 and 4, for shaping gyroid structures is a commercial porous filament available as 3D POROLAY Layfomm filament. The diameter of the filament is 1.75 mm. The filament is comprised of two parts: a first part consisting of an unidentified elastomeric polymer and a second part consisting of polyvinyl alcohol (PVA). The latter has the feature of being soluble in water, thus creating a controlled microporosity and flexibility properties after rinsing the filament in an aqueous medium.

2.3. Formo-Phenolic Pre-Ceramic Resin Used for Impregnation.

The impregnation resin allowing to obtain a carbonaceous residue after pyrolysis is, in the case of samples 1 and 3, the resin called ABLAPHENE RS 101® available from the Rhodia® Company. This is a formo-phenolic resin, liquid at room temperature and relatively viscous (500 mPa·s at 20° C.). This resin may be used pure (in the case of sample 1) but it may also be diluted in ethanol (in the case of sample 3).

2.4. Polycarbosilane Pre-Ceramic Resin Used for Impregnation.

In the case of samples 3 and 4, the impregnation resin allowing to obtain a ceramic residue after pyrolysis is a thermosetting pre-ceramic resin derived from polycarbosilane. This resin enables an amorphous ceramic to be obtained after a polymerisation step followed by pyrolysis under an inert atmosphere.

This resin, called SMP-10, and resulting after pyrolysis in pure silicon carbide (SiC), is available from Starfire System®. It is allylhydridopolycarbosilane (AHPCS). Its theoretical chemical formula is represented below.

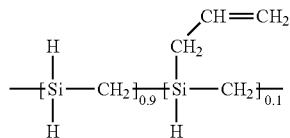

Resin SMP-10 is liquid at room temperature and has a density of approximately 1 g/L. From the latest batches of commercial resin, it is not uncommon to obtain a significant percentage of free carbon in the ceramic obtained after pyrolysis. The SVC atomic ratio after pyrolysis of the SMP-10 resin is 0.738. This resin is used in pure form.

3. Parameters for Producing the Preform by 3D Printing—Step a) of the Method According to the Invention.

3.1. 3D Printing File.

From the characteristic equations describing the gyroid shape (Equations (1) and (2) given above), SolidWork® software is used to generate the desired structure and create a 3D printing file which is recorded. The selected gyroid structure is defined by equation (1), for a value of t=0.8. After exporting the file to a 3D printer, the structure is then printed using this printer.

3.2. 3D Printer.

The 3D printer used is an Ultimaker® 2 GB printer. The maximum resolution is 20 microns, the printing volume is: 120 mm×120 mm×115 mm. The maximum printing speed is 300 mm/s. The filament of PLA as well as that of microporous polymer POROLAY are easily adaptable to this type of machine. Printer characteristics and printing parameters are summarised in Table 2 below.

TABLE 2

Printer characteristics and 3D printing parameters.

| | Values |
|---|---|
| Printer characteristics | |
| Printing time | 1 h 31 min 46 s |
| Number of layers | 146 |
| Total number of rows | 155908 |

TABLE 2-continued

Printer characteristics and 3D printing parameters.

|  | Values |
|---|---|
| Filament required (mm) | 6166 |
| Printing parameters | |
| Filament diameter (mm) | 1.75 |
| Layer height (mm) | 0.3 |
| Filling rate (%) | 20 |
| Average speed (mm/s) | 6 |

3.3. Dipping the Printed Structure into Water (Only for Samples 3 and 4).

In order to reveal the microporosity of the printed structure in the case of samples 3 and 4, made of microporous PVA, a beaker and a sufficient amount of water are required. The structures are completely immersed in water and water is replaced every 12 hours to remove PVA as much as possible.

The impregnation resins used in the next step (RS101 and SMP10) are miscible in ethanol. Before impregnation with the resin, the structures are therefore dipped in an ethanol beaker to remove excess water.

4. Parameters of the Pre-Ceramic Resin Impregnation Step—Step b) of the Method According to the Invention.

4.1. Impregnation Method.

The method used to carry out impregnation by the pre-ceramic resin is relatively simple to implement. The sample is held by a steel wire, placed between the macropores of the structure. The resin is placed in a beaker. The structure is dipped in the resin and then the excess resin is removed by simple draining. The structure is not placed under vacuum.

The amount of resin impregnated within the structure is determined by simply weighing the samples before impregnation and after draining.

4.2. Oven Used for Cross-Linking the Resin.

A Venticell® oven is used in order to achieve crosslinking of the resin. This oven can heat the samples up to 250° C. under air. The samples are simply put on an aluminium plate.

The weight variation due to the resin curing phenomenon as well as to the solvent evaporation is determined by simply weighing the structures before and after cross-linking.

4.3. Pyrolytic Oven.

To perform pyrolysis of the samples, a horizontal tubular oven available from CERHEC, with a maximum working temperature of 1150° C., is used. This oven is equipped with two hot zones the temperature of which can be controlled separately. Pyrolysis is carried out under a nitrogen atmosphere (99.999% pure). The oven is equipped with alumina (good heat conductor) heating elements arranged all around the working tube. This tube is tailor-made of pure silica. A software program allows the selected thermal cycle to be programmed. The temperature is controlled by virtue of a thermocouple placed between the working tube and the heating elements. The maximum working temperature is 1150° C., but it is preferable not to exceed 1100° C. A vane pump is used to create vacuum before filling the tube with nitrogen. The pyrolysis yield is calculated by weighing the samples before and after heat treatment.

4.4. Furnace, CVI/CVD Reactor.

The reactor selected for the CVD treatments is comprised of four independent parts:
- a system for introducing the reactive gases ($H_2$ and Methyltrichlorosilane (MTS)) into the reactor.
- a system for heating the reactor or resistive oven (maximum temperature of 1500° C.).
- a vertical reactor.
- a pumping system downstream of the reactor as well as cryogenic traps.

The reactor designed is therefore an assembly of different components allowing the injection of the gas mixture, the installation of a substrate of the desired size and geometry within the reactor, and the deposition of carbides.

The reactor used is comprised of these different elements which are necessary for CVD deposition.

The resistive oven with a maximum temperature of 1500° C. allows heating of the samples in the reactor.

The gas reaction takes place in a SiC tube. The two ends of the tube, consisting of an O-ring system, ensure that the reactor is tightly sealed, and are equipped with a water cooling device (closed loop) and fans. In order to maintain a primary vacuum, connection systems made of stainless steel specially designed for introducing gases ($H_2$ and Methyltrichlorosilane (MTS)) and discharging the same are installed at the reactor inlet and outlet. The gas lines include flow meters. Those for $H_2$ have a flow rate range from 0 to 300 sccm (standard cubic centimeters per minute). That of MTS has a range from 0 to 258 sccm.

Introducing gases into the oven is made by virtue of manual and pneumatic valves. In order to avoid as much as possible pollution caused by the use of corrosive gases, the bottom of the reactor is connected by means of a flexible tube to cryogenic traps (cooled during the experiment by liquid nitrogen). A vane pump placed downstream of the cryogenic traps is connected to these traps using a reinforced polymer pipe. The pump has on top of it a ball valve allowing its isolation and a motorised valve for regulating the reactor pressure.

5. Results

In the following examples 1 to 4, 4 samples, parts 1, 2, 3, and 4, are prepared by the method according to the invention.

For each sample tested, most of the experimental conditions are identical, namely:
- type of gyroid structure,
- 3D printing parameters,
- parameters for heat treatment,
- parameters for CVD processing.

On the other hand, the nature of the fibres, filaments used for 3D printing is different.

They are fibres, filaments made of PLA to prepare samples 1 and 2, and POROLAY fibres to prepare samples 3 and 4.

Likewise, the impregnation resin is different.

It is a resin RS101 to prepare samples 1 and 3, and a resin SMP10 to prepare samples 2 and 4.

Example 1

In this example, sample 1 is prepared by the method according to the invention.

This sample 1 is also called sample PLA-RS101 because it is prepared using filaments of PLA for the 3D printing step for manufacturing the preform, and phenolic resin RS101 for the impregnation step.

Impregnation step.

Preforms of PLA are impregnated with a phenolic resin, namely pure resin RS101, according to the protocol described above. The impregnation time period is 1 minute.

Cross-linking step.

Impregnation is followed by cross-linking of the resin in the oven at 170° C. under air.

Pyrolysis step.

Cross-linking is followed by the pyrolysis of the resin, in the oven. For this, the temperature of the oven is increased at a rate of 1° C./minute, until it reaches 850° C. Pyrolysis is carried out under $N_2$ at 850° C. for a time period of 1 hour.

A carbonaceous residue is thus obtained which is then reinforced by rapid CVD (deposition rate of 13 μm/hour) of SiC.

Step of Depositing SiC by CVD

This step is carried out at a temperature of 1200° C. and under a pressure of
100 mbar, for a time period of 6 hours, and with a equal to 3.

Methyltrichlorosilane (MTS) is used as a precursor.

α is the ratio of the hydrogen flow rate to the MTS flow rate.

For each step of the method, or rather of the transformation, the macroscopic bulk (apparent) density $\rho^*$ is measured (by dividing the weight by the total volume, and by considering the gyroid as a cube).

The macroscopic bulk density $\rho^*$ of the raw preform made of PLA is
0.25 g/cm$^3$.

The macroscopic bulk density $\rho^*$ of the part obtained at the end of pyrolysis is 0.048 g/cm$^3$.

The macroscopic bulk density $\rho^*$ of the part obtained by CVD is 0.31 g/cm$^3$, and includes 80% by weight of SiC, which clearly shows that densification has taken place during the CVD step of the method according to the invention.

For each step of the method, or rather of the transformation, an X-ray tomography with a resolution of 20 μm makes it possible to show the three-dimensional structure of the gyroid.

FIGS. 2A, 2B, and 2C therefore show X-ray tomography images of a cross-section of a gyroid structure at the different stages of the method according to the invention, called the ceramisation method, to obtain sample 1 in example 1.

It is noted that the structure of PLA is very dense (FIG. 2A). The wall thickness (e 1 wall) of the gyroids is about 1 mm. During impregnation, the phenolic resin does not infiltrate at the heart of the walls and only covers the specific surface of the structure. This results, after pyrolysis, in a skeleton which takes the shape of the gyroid walls contour (FIG. 2B). To ensure acceptable mechanical strength, the phenolic resin has to be used in concentrated form, which yields a significant amount of ex-pyrolysis (that is from pyrolysis) vitreous carbon. Since vitreous carbon yields gaseous species under oxidising conditions, it is necessary to minimise its proportion within the final material.

As the resin did not infiltrate, PLA decomposition at high temperature during pyrolysis left a fairly large void thickness (in the order of the thickness of the initial wall, that is about 1 mm).

The rapid CVD step allows the outside of the carbon walls to be reinforced, but the SiC also infiltrates on the internal walls, showing the porous aspect of the ex-pyrolysis carbon.

Example 2

In this example, a sample 2 is prepared by the method according to the invention.

This sample 2 is also referred to as sample PLA-SMP10 because it is prepared using filaments of PLA for the 3D printing step of manufacturing the preform, and pre-ceramic resin SMP10 for the impregnation step.

In this example, in order to minimise the amount of ex-pyrolysis carbon and to fill the walls of the structures by CVD more efficiently, the phenolic resin (RS101) is replaced in the impregnation step by a pre-ceramic resin, namely resin SMP10.

One advantage of using this resin SMP10 is that it produces a highly fragmented PDC (Polymer Derived Ceramics) ceramic residue after pyrolysis, which can be more easily reinforced by CVD than the structure obtained after pyrolysis of the phenolic resin in example 1.

Impregnation step: The gyroid preforms, structures made of PLA are impregnated with pure resin SMP10, which is much more fluid than the phenolic resin RS101, according to the protocol described above. The impregnation time period is 1 minute.

Cross-linking step: The resin is then cross-linked in the oven at 165° C. under air for a time period of 3 hours.

Pyrolysis step: Cross-linking is followed by pyrolysis of the resin in the oven. For this, the oven temperature is increased at a rate of 1° C./minute until 1000° C. is reached. Pyrolysis is carried out at 1000° C. for a time period of 1 hour.

The resin is pyrolysed under $N_2$ to avoid any SiC oxidation at high temperature.

An amorphous pre-ceramic residue is then obtained which is then reinforced by rapid CVD of SiC, with a deposition rate of 13 μm/hour.

Step of Depositing SiC by CVD.

This step is carried out at a temperature of 1200° C. and under a pressure of
100 mbar, for a time period of 6 hours and with a equal to 3.

Methyltrichlorosilane (MTS) is used as a precursor.

α is the ratio of the hydrogen flow rate to the MTS flow rate.

For each step of the method, or rather of the transformation, the macroscopic bulk density $\rho^*$ is measured (by dividing the weight by the total volume, and by considering the gyroid as a cube).

The macroscopic bulk (apparent) density $\rho^*$ of the raw preform made of PLA is 0.11 g/cm$^3$.

The macroscopic bulk density $\rho^*$ of the part obtained at the end of the pyrolysis is 0.054 g/cm$^3$.

The macroscopic bulk density $\rho^*$ of the part obtained at the end of the CVD is 0.56 g/cm$^3$, and comprises 84% by weight of SiC, which clearly shows that densification has occurred during the CVD step of the method according to the invention.

For each step of the method, in other words of the transformation, an X-ray tomography with a resolution of 20 μm makes it possible to show the three-dimensional structure of the gyroid.

FIGS. 3A, 3B, and 3C therefore show X-ray tomography images of a cross-section of a gyroid structure at the different stages of the method according to the invention, called the ceramisation method, to obtain sample 2 in example 2.

The structure obtained after the pyrolysis step (FIGS. 4A and 4B) is also observed with the (SE) Scanning Electron Microscope (SEM).

It is noted that the amorphous pre-ceramic residue obtained at the end of the pyrolysis step has a geometry similar to the starting object, structure, gyroid made of PLA (FIGS. 3B and 4A, 4B).

However, it is noted that this amorphous pre-ceramic residue has a volume shrinkage of about 20%. This is due to the evaporation of oligomers and gaseous by-products (mostly $H_2$) during the conversion to ceramic. This results in high porosity after pyrolysis, in the form of numerous cracks within the ceramic skeleton (FIG. 4A): these cause a decrease in mechanical strength but dramatically increase the surface area on which SiC can be deposited by CVD.

Due to the large specific surface area developed by the ex-PDC skeleton, the walls are more reinforced after 6 hours of deposition than with the use of phenolic resin RS101. However, empty zones (the largest ones) could not be filled due to their large size. As the gases have diffused within the walls of the structure, their outer reinforcement is lessened. Continuing the deposition for a few more hours (for example 4 hours) would probably allow a more efficient reinforcement of the outer walls of the gyroids.

Example 3

In this example, a sample 3 is prepared by the method according to the invention.

This sample 3 is also called sample POROLAY—RS101 because it is prepared using POROLAY filaments for the 3D printing step for manufacturing the preform, and phenolic resin RS101 for the impregnation step.

After 3D printing with POROLAY filament, the gyroid structures, preforms are dipped in a beaker filled with water for 4 days.

Water is replaced every 12 hours in order to remove PVA which is one of the two components that constitute the POROLAY. Dissolution of PVA allows to reveal the microporosity of the structure obtained, which makes it very flexible. This structure consists of an elastomer which is the other component that constitutes the POROLAY.

An SEM image (FIG. 5) after dipping in water enables this microporosity to be viewed, which is conducive to impregnation by the resin in the next step of the method.

In order to remove water, the structure is then dipped for one minute in a beaker filled with ethanol. Ethanol is indeed a good solvent for the formo-phenolic resin RS101. Excess ethanol is removed by mean of absorbent paper. The sample is then weighed, and the weight thus measured is called as $m_{before\ impregnation}$.

Impregnation step: The next step is the impregnation of the resin RS101 within the microporosity.

The structure is dipped in a beaker filled with diluted phenolic resin (50% RS101/50% EtOH) for 1 minute and then the excess resin is drained off for 1 hour. The sample is then weighed and the weight thus measured is called $m_{after\ impregnation}$.

Cross-Linking Step.

The resin is then cross-linked.

Resin cross-linking and ethanol evaporation take place under air, in the Venticell® oven. The temperature programme for curing the resin is as follows:

Starting temperature: 100° C.

Temperature ramp at a rate of 0.4° C./minute up to 165° C.

Temperature plateau at 165° C. for 3 hours.

The sample is then weighed and the weight thus measured is called ($m_{after\ crosslinking}$). After cross-linking, the deformation of the structure is slight and only oriented in the direction of the weight of the sample. The formo-phenolic resin has cured.

Pyrolysis Step.

In order to remove the elastomer and obtain a carbon residue, pyrolysis of the sample is necessary.

The pyrolysis is carried out in a nitrogen atmosphere, according to the following temperature programme:

Starting temperature: 20° C.

Temperature ramp at a rate of 5° C./minute, up to 150° C.

Temperature ramp at a rate of 1° C./minute up to 600° C.

Temperature ramp at a rate of 5° C./minute up to 850° C.

Cooling: decreasing temperature ramp at a rate of 20° C./minute, down to 20° C.

Indeed, parallel works have shown that elastomer decomposition occurs at temperatures between 300° C. and 320° C.; this is why a slow temperature rise ramp (1° C./min) is set up between 150° C. and 600° C. After pyrolysis, the residue is weighed and the weight thus measured is called ($m_{after\ pyrolysis}$).

After pyrolysis, SEM images of the sample surface have been made and are set out in FIGS. 6A, 6B and 6C. It is noticed that the carbonaceous residue is rather dense. A few microporosities can be observed.

Table 3 summarises all the weights obtained after each step of the method to prepare sample 3.

TABLE 3 weights obtained after each step of the method to prepare sample 3.

| $M_{before\ impregnation}$ | $M_{after\ impregnation}$ | $M_{after\ cross-linking}$ | $M_{after\ pyrolysis}$ |
|---|---|---|---|
| 1.54 g | 2.62 g | 1.59 g | 0.21 g |

Pyrolysis yields an isotropic shrinkage of about 20%. The shape of the initial structure is maintained. The structure holds but its apparent mechanical properties seem poor.

Step of Depositing SiC by CVD.

The last step of the method consists in reinforcing the material by a step of depositing SiC by CVD, with MethylTrichloroSilane (MTS) as a precursor.

The samples are placed in the centre of the CVD reactor, and the experimental conditions selected are set out in Table 4.

TABLE 4

Experimental conditions for CVD processing.

| $T_{oven}$ | $t_{reaction}$ | $P_{total}$ | $Q_{MTS}$ | $Q_{H2}$ |
|---|---|---|---|---|
| ° C. | h | mBar | Sccm* | Sccm* |
| 1200 | 6 h | 100 | 200 | 600 |

*sccm = flow rate in cm³/min at 20° C. and 1013 mbar.

The time period of the deposition by CVD is 6 hours.

After CVD, the sample is weighed and the measured weight is called $m_{after\ CVD}$. This weight is 1.17 g. 0.96 g of SiC has been deposited onto the structure, significantly improving the apparent mechanical properties.

An SEM observation of the surface of the SiC deposit was made (FIGS. 7A, 7B, and 7C).

FIGS. 7A and 7B show the SiC deposit over the entire surface of the gyroid.

FIG. 7C highlights the SiC microstructure.

A microstructure characteristic of a high temperature deposition (1200° C.) is noted in FIG. 7C. SiC is very well crystallised as shown by a Raman spectroscopy analysis which was carried out in parallel.

For a more precise analysis, samples obtained after the pyrolysis step (post-pyrolysis sample) and after the CVD step (post-CVD sample) were tomographed.

FIG. 8A is the X-ray tomography image of a cross-section of the gyroid structure obtained after the pyrolysis step of resin RS101 (post-pyrolysis image).

FIG. 8B is the image of the gyroid structure obtained after the chemical vapour deposition CVD step (post-CVD image).

After pyrolysis, an effective impregnation of the phenolic resin (RS101) is observed within the walls of the structure.

Opening the microporosity by dissolution of the PVA allowed a deep penetration of the resin. Diluting the resin in ethanol allows to reduce the viscosity and thus facilitates the impregnation.

Example 4

In this example, a sample 4 is prepared by the method according to the invention.

This sample 4 is also called POROLAY—SMP10 sample because it is prepared using POROLAY filaments for the 3D printing step for manufacturing the preform, and a resin SMP 10 for the impregnation step.

The preparation method of sample 4 is strictly identical to the preparation method for sample 3 up to the resin impregnation step.

In this example 4, resin SMP10 is used instead of resin RS101 that was used in example 3.

Cross-Linking Step and Pyrolysis Step.

The cross-linking and pyrolysis steps are carried out in the same way as in example 3 to prepare sample 3.

During cross-linking in the oven, the deformation is here slightly greater than when using a phenolic resin as in the method in example 3 to prepare sample 3.

During pyrolysis, the shrinkage is isotropic and is about 20%.

Step of Depositing SiC by CVD.

The step of depositing SiC by CVD is carried out in the same way as the method in example 3 to prepare sample 3.

The different weights obtained after each step are shown in Table 5 below.

An SEM observation of the surface of the gyroid structure obtained after the pyrolysis step of the resin SMP10 (post-pyrolysis sample) has been carried out.

FIGS. 9A and 9B highlight cracks in the ceramic residue (PDC).

FIG. 9C is a close-up ("zoom") of a crack.

After pyrolysis, the resin SMP10 therefore has a tendency to crack (FIGS. 9A, 9B, and 9C), decreasing the apparent mechanical strength but considerably increasing the surface area on which the CVD deposition can be made.

The sample has been tomographed after pyrolysis and after CVD reinforcement.

FIGS. 10A, 10B and 10C show X-ray tomography images of a cross-section of a gyroid structure at different stages of the method according to the invention, to obtain sample 4 in Example 4.

FIG. 10A is the image of the gyroid structure obtained after the pyrolysis step of the resin SMP10 (post-pyrolysis image).

FIGS. 10B and 10C are images of the gyroid structure obtained after the chemical vapour deposition CVD step (post-CVD image).

FIG. 10C is an enlarged image of a framed portion of FIG. 10B.

Despite slight deformation after pyrolysis, the initial gyroid shape is retained. During CVD deposition, cracks obtained after pyrolysis of the pre-ceramic resin allow to provide a porosity conducive to gas infiltration. Hence, the inner and outer walls of the gyroid are reinforced (this was not the case with sample 3), significantly improving the apparent mechanical properties.

Conclusion of the Examples.

During the manufacturing step, two filaments have been tested: one made of PLA and the other based on elastomer and PVA of the brand POROLAY. The latter gives the best results because it allows, after washing in water, a microporous microstructure to be obtained which proves to be particularly interesting for the infiltration of the resin in the next, transformation step.

In the transformation step, two impregnating resins were used: resin RS101 and resin SMP10.

The resin SMP10 has some advantages in the final method:
In its pure state, SMP10 is much more fluid than RS101, making impregnation easier.
After pyrolysis, SMP10 tends to crack, leaving a porosity conducive to the infiltration of CVD gases.
After CVD, the inner and outer walls of the gyroid (sample 4) are covered with an SiC deposit (with RS101, only the outer wall is reinforced—sample 3).
After pyrolysis, the residue is made of ceramic (SiC) and not carbon, which will probably yield better oxidation resistance properties.

In conclusion, in terms of mechanical strength and oxidation resistance, sample 4 gives the best results.

TABLE 5

Weights obtained after each step of the method to prepare sample 4.

| $M_{before\ impregnation}$ | $M_{after\ impregnation}$ | $M_{after\ cross-linking}$ | $M_{after\ pyrolysis}$ | $M_{after\ CVD}$ |
|---|---|---|---|---|
| 1.65 g | 2.32 g | 1.99 g | 0.34 g | 1.79 g |

What is claimed is:

1. A method for manufacturing a part made of a first ceramic or made of carbon, consolidated by a second ceramic, having a determined geometry, wherein the following successive steps are carried out:
   a) a preform made of an organic polymer is manufactured, the preform having the same geometry as the part to be manufactured;
   b) the preform made of an organic polymer is impregnated with a first-ceramic precursor resin or a carbon precursor resin;
   c) the first-ceramic precursor resin or the carbon precursor resin is cross-linked and/or polymerised and then pyrolysed;
   d) optionally, steps b) and c) are repeated;
   whereby, at the end of step c) or step d), a part made of a first ceramic or made of carbon, having the same geometry as the part to be manufactured, is obtained;
   e) the second ceramic is deposited onto the part made of a first ceramic or made of carbon obtained at the end of step c) or step d), by a Chemical Vapour Deposition (CVD) method or a Chemical Vapour Infiltration (CVI) method; and
   wherein no second ceramic is present in steps a)-d).

2. The method according to claim 1, wherein the determined geometry is a complex geometry.

3. The method according to claim 1, wherein the first ceramic is selected from oxide ceramics, nitride ceramics, and carbide ceramics.

4. The method according to claim 3, wherein the first ceramic is selected from silicon carbide, titanium carbide, zirconium carbide, hafnium carbide, and tantalum carbide.

5. The method according to claim 1, wherein the organic polymer is a thermoplastic polymer.

6. The method according to claim 5, wherein the thermoplastic polymer is selected from polylactic acids (PLA), polycarbonates, polyamides, poly (vinyl chloride) (PVC), acrylonitrile-butadiene-styrene (ABS) polymers, thermoplastic elastomeric polymers, and mixtures thereof.

7. The method according to claim 1, wherein the preform made of an organic polymer is prepared by an additive manufacturing method.

8. A method according to claim 7, wherein the additive manufacturing method is a fused filament 3D printing method.

9. The method according to claim 1, wherein the preform made of an organic polymer has a porosity.

10. The method according to claim 1, wherein the first-ceramic precursor resin is selected from polycarbosilane resins, and the carbon precursor resin is selected from phenolic resins.

11. The method according to claim 1, wherein the second ceramic is selected from oxide ceramics, nitride ceramics, and carbide ceramics.

12. The method according to claim 11, wherein the second ceramic (consolidation ceramic) is selected from silicon carbide, titanium carbide, zirconium carbide, hafnium carbide, and tantalum carbide.

13. The method according to claim 1, wherein the part is made of a first ceramic, and the second ceramic is identical to the first ceramic.

14. The method according to claim 6, wherein the thermoplastic elastomeric polymers are polyurethane thermoplastic elastomeric polymers.

15. The method according to claim 9, wherein the porosity is a microporosity.

16. The method according to claim 10, wherein the phenolic resins are formo-phenolic resins.

17. The method according to claim 13, wherein the first ceramic is SiC.

18. A method for manufacturing a part made of a first ceramic or made of carbon, consolidated by a second ceramic, having a determined geometry, wherein the method consists of the following successive steps:
   a) a preform made of an organic polymer is manufactured, the preform having the same geometry as the part to be manufactured;
   b) the preform made of an organic polymer is impregnated with a first-ceramic precursor resin consisting of one ceramic precursor, or a carbon precursor resin;
   c) the first-ceramic precursor resin or the carbon precursor resin is cross-linked and/or polymerised and then pyrolysed;
   d) optionally, steps b) and c) are repeated;
   whereby, at the end of step c) or step d), a part made of a first ceramic or made of carbon, having the same geometry as the part to be manufactured, is obtained;
   e) the second ceramic is deposited onto the part made of a first ceramic or made of carbon obtained at the end of step c) or step d), by a Chemical Vapour Deposition (CVD) method or a Chemical Vapour Infiltration (CVI) method.

* * * * *